Patented July 5, 1938

2,122,716

UNITED STATES PATENT OFFICE 2,122,716

HYDROXY CARBOXYLIC ACID ESTERS OF LONG CHAIN ALCOHOLS

George D. Graves, Wilmington, Del., assignor to E. I. du Pont de Nemours & Company, Wilmington, Del., a corporation of Delaware No Drawing. Application December 4, 1934, Serial No. 755,909. In Canada August 2, 1933

16 Claims. (Cl. 260—106)

This invention relates to new compositions of matter, and particularly to esters of 10 to 14 carbon atom alcohols with certain saturated aliphatic hydroxy carboxylic acids.

This case is a continuation in part of copending application Serial No. 543,386, filed July 10, 1931 which issued on March 12, 1935 as U. S. Patent 1,993,736.

The esters of the present invention may be made by various means, for example as follows:

A. By heating a hydroxy acid with an alcohol, for example, citric acid with dodecyl alcohol.

B. By heating a long chain alcohol with an ester of a volatile alcohol with a hydroxy acid, for example, tetradecyl alcohol with ethyl lactate. Catalysts such as litharge, and sodium or aluminum alcoholates may be used.

C. By forming an ester of an unsaturated acid followed by hydration, for example, forming didodecyl maleate by heating dodecyl alcohol with maleic anhydride followed by sulfation of the ester and hydrolysis to the hydroxy ester.

D. By heating the cyclic double esters, the lactides, with long-chain alcohols, for example, heating tetradecyl alcohol with diglycolide.

E. By heating the sodium salts of the hydroxy acids with long-chain alkyl halides, for example, sodium lactate with decyl bromide.

Having outlined above the general principles and procedures of the invention, the following exemplifications thereof are added for purposes of illustration but not in limitation:

Example 1.—Tridodecyl citrate

Nineteen parts by weight of citric acid and 61 parts by weight of dodecyl alcohol were heated at 200° C. for 17 hours. Carbon dioxide was passed thru the reaction mixture during the heating. The product was a yellow oil which solidified slowly at 21–24° C. The product was subjected to vacuum distillation and 24 parts by weight were removed by distilling up to 250° C. at 20 mm. The product had a saponification number of 237 and melted at 26° C.

Example 2.—Dodecyl lactate

Two hundred five parts by weight of dodecyl alcohol, 118 parts by weight of ethyl lactate, 400 parts by weight of toluene and 10 parts by weight of litharge were heated under a 4 ft. reflux column until the temperature of the distilling liquid was constant at 105–110° C. The product was filtered and washed with salt water and the toluene removed by distillation. On fractional distillation of the product, 82 parts by weight of a water-white oil was obtained which boiled at 150° C./2 mm. and had a saponification number of 214.

Example 3.—Dodecyl tartrate

Fifty-five and eight-tenths parts by weight of dodecyl alcohol and 50.4 parts by weight of tartaric acid were heated in a 500 cc. round-bottom flask at 150–160° C. for 2 hours. On cooling, the mass became solid and was then dissolved in ethyl ether and washed with water until neurtla. Evaporation of the solvent left 58 parts by weight of a cream-colored solid which melted at 53–55° C.

The hydroxy acid esters of the present invention are also of use in that they may be esterified yielding, for example, the lauric acid ester of dodecyl lactate.

Other hydroxy acid esters may be substituted for the dodecyl lactate, such as octyl hydracrylate, tetradecyl tartrate, dodecyl citrate, tetradecyl malate, and dodecyl trihydroxy-glutarate. In addition other monobasic aliphatic acids besides lauric may be used, such as acetic, butyric, caprylic, capric, myristic, palmitic, oleic, etc. It will be understood that in place of the acid which is used for esterifying the hydroxy acid ester, the anhydride, acyl halide or other acid derivatives may be used. In addition to sulfuric acid, hydrochloric acid and benzenesulfonic acid may be employed as catalysts in order to speed up the esterification. While a solvent immiscible with water is preferred in this process in order to remove the water formed by esterification, it is not necessary. These acylated derivatives of long-chain esters of hydroxy acids are particularly useful as softeners in cellulose derivative compositions comprising cellulose nitrate or cellulose ethers, such as ethyl, butyl, or benzyl cellulose and particularly useful in the manufacture of artificial leather. They may also be employed with natural resins or synthetic resins, with bituminous substances, with other plasticizers, with solvents, pigments, fillers, etc., for use in molding, as adhesives, or binders, as impregnating, toughening and waterproofing agents for paper, wood, textiles, stone, etc. In those cases where a softening agent is desired which combines the features of good stability on aging and a moderately high exudation temperature, these new compositions of matter are of utility, and in this connection are superior to castor oil. Further, these derivatives do not have the tendency to become rancid and thereby show advantage over castor oil which is used as a softener in artificial leather.

*Example 4.—Coconut alcohol esters of lactic acid*

Coconut oil was subjected to carboxylic hydrogenation and the resulting product was washed with water to remove water-soluble materials. After drying in a suitable manner, such as with sodium sulfate, the resulting mixture of coconut alcohols had a molecular weight of about 200. Fractionation of this mixture of alcohols indicated that it had approximately the following composition: hexyl alcohol 4 parts, octyl alcohol 81 parts, decyl alcohol 60 parts, dodecyl alcohol 390 parts, tetradecyl alcohol 160 parts, cetyl alcohol 115 parts, octadecyl alcohol 55 parts, and eicosyl alcohol 15 parts. Two hundred parts by weight of the mixture of alcohols, 118 parts by weight of ethyl lactate, 400 parts by weight of toluene, and 10 parts by weight of litharge were heated under a 4 ft. fractionating column until the temperature of the distilling liquid was constant at 105°–110° C. The product was filtered and washed with salt water and the toluene recovered by distillation. The residue was a yellow colored viscous oil composed of the various alcohol esters of lactic acid in which the dodecyl ester predominated. In place of the above mixture of alcohols, there may be used a mixture of alcohols representing an intermediate fraction isolated in the fractionation of coconut alcohols, that is found particularly useful for plasticizing cellulose nitrate compositions and is composed of decyl alcohol 3 parts, dodecyl alcohol 39 parts, tetradecyl alcohol 16 parts, cetyl alcohol 10 parts, and octadecyl alcohol 3 parts. For certain applications such as in combinations with nitrocellulose, it is preferred to use lactates of a mixture of alcohols as represented by the above examples in place of pure dodecyl lactate since the mixture of esters is more readily retained by plastic compositions and does not have a tendency to exude.

In place of the coconut oil hydrogenated in the above example, coconut oil acids, palm kernel oil or palm kernel oil acids or other essentially saturated fatty oils or acids therefrom may be used and the alcohols therefrom esterified as above.

Saturated aliphatic low molecular weight hydroxy carboxylic acids in general may be used including glycolic acid, hydracrylic acid, tartaric acid, citric acid, malic acid, trihydroxyglutaric acid, and beta hydroxybutyric acid. By "saturated aliphatic low molecular weight hydroxy carboxylic acid" is meant a saturated aliphatic hydroxy carboxylic acid having up to six carbon atoms.

Straight chain aliphatic primary alcohols of 10 to 14 carbon atoms are generally useful in the preparation of these esters and include not only the pure alcohols, but also the mixture of alcohols obtainable by the carboxylic hydrogenation of essentially saturated fatty oils such as coconut oil or palm kernel oil, or the acids derivable from these oils by saponification or the esters thereof with monohydric alcohols.

While esters of alcohols in the range of carbon atoms of 10 to 14 are included within the scope of the present invention, certain esters within that range are preferred for various purposes. Thus, dodecyl lactate is preferred as a plasticizer to decyl and tetradecyl lactate. Esters of monobasic acids are preferred to those of polybasic acids. Thus, dodecyl salicylate or dodecyl lactate is preferred to dodecyl citrate or dodecyl tartrate as an intermediate for sulfation. Further, esters of monobasic hydroxy fatty acids, for example dodecyl lactate, are preferred to esters of aromatic acids, such as dodecyl salicylate, for use as meditizens.

The preferred method of making the esters of hydroxy acids of the present invention consists in reacting the long chain alcohol with an ester of the hydroxy acid with a more volatile alcohol.

The compounds of this invention may be used in the preparation of lacquers and enamels for coating metal, wood, fabric, paper, and wire screen, dopes for coating fabrics, moistureproof lacquers for coating regenerated cellulose, etc., and in plastic compositions to be used in the manufacture of toiletware, sheeting, rods, tubes, safety glass interlayers, dentures, etc. Certain of the acid esters, for examples the citrates, are effective antioxidants for edible oils.

The hydroxy acid esters of the present invention are also of use in that they may be esterified yielding, for example, the lauric acid of dodecyl lactate, which ester and the mixture comprising the same, coconut oil fatty acid esters of the lactate of coconut oil alcohols, are of use as plasticizers for nitrocellulose, for example, in coated fabrics. The hydroxy acid esters are also of use in that they may be etherified most conveniently through the halide ester of the hydroxy acid ester by reacting the same with a sodium salt of an alcohol or phenol, for example, sodium ethylate, benzylate, phenolate, naphtholate, dodecylate, etc.

The long chain esters of this invention are high-boiling compounds of low volatility and are useful as plasticizers for cellulose derivatives. Amyl lactate, for example, is a solvent for cellulose derivatives but is too volatile and will not remain in a cellulose composition for a sufficient length of time to be considered a plasticizer. Dodecyl lactate (B. P. 150° C. at 2 mm.) is sufficiently non-volatile to serve as an acceptable plasticizer for cellulose derivatives. Insolubility in water is an important property of compounds for many industrial applications. Amyl lactate is considerably more soluble in water than dodecyl lactate, hence dodecyl lactate is preferred to amyl lactate for use, for example, in cellulose derivative compositions. Dodecyl lactate is even less volatile than decyl lactate and is less soluble in water than decyl lactate, hence in applications where compounds of a more wax-like nature are required, dodecyl lactate is preferred to decyl lactate. The waxy nature of octadecyl lactate renders it less compatible with cellulose derivatives than dodecyl lactate and for this application dodecyl lactate is preferred to octadecyl lactate.

The above description and examples are intended to be illustrative only. Any modification of or variation therefrom which conforms to the spirit of the invention is intended to be included within the scope of the claims.

I claim:

1. Dodecyl lactate.

2. An ester of a straight chain primary alcohol of 10 to 14 carbon atoms with a saturated aliphatic low molecular weight hydroxy carboxylic acid.

3. The ester of claim 2 wherein the acid is a monocarboxylic acid.

4. An ester composition wherein the mixture of alcohols obtainable by the carboxylic reduction of the acyl radicals of an essentially saturated fatty oil, said mixture being comprised principally of dodecyl alcohol, is esterified by a saturated aliphatic low molecular weight hydroxy carboxylic acid.

5. An ester composition wherein the mixture of alcohols obtainable by the carboxylic reduction of the acyl radicals of coconut oil, said mixture being comprised principally of dodecyl alcohol, is esterified by a saturated aliphatic low molecular weight hydroxy carboxylic acid.

6. The ester composition of claim 5 wherein the acid is a monocarboxylic acid.

7. A dodecyl ester of a saturated aliphatic low molecular weight hydroxy carboxylic acid.

8. A dodecyl ester of a saturated aliphatic low molecular weight hydroxy monocarboxylic acid.

9. An ester composition wherein the mixture of alcohols obtainable by the carboxylic reduction of the acyl radicals of coconut oil, said mixture being comprised principally of dodecyl alcohol, is esterified by lactic acid.

10. An ester of a straight chain primary alcohol of 10 to 14 carbon atoms with lactic acid.

11. A tetradecyl ester of a saturated aliphatic low molecular weight hydroxy carboxylic acid.

12. A process for the preparation of esters which comprises heating a saturated straight chain aliphatic alcohol of ten to fourteen carbon atoms with a member of the class consisting of saturated aliphatic low molecular weight hydroxy carboxylic acids and their esters with volatile alcohols.

13. An ester of a straight chain primary alcohol of 10 to 14 carbon atoms with a saturated aliphatic low molecular weight hydroxy carboxylic acid of the class consisting of lactic, glycolic, hydracrylic, tartaric, citric, malic, trihydroxyglutaric and beta hydroxybutyric acids.

14. An ester composition wherein the mixture of alcohols obtainable by the carboxylic reduction of the acyl radicals of an essentially saturated fatty oil, said mixture being comprised principally of dodecyl alcohol, is esterified by a saturated aliphatic low molecular weight hydroxy carboxylic acid of the class consisting of lactic, glycolic, hydracrylic, tartaric, citric, malic, trihydroxyglutaric and beta hydroxybutyric acids.

15. An ester composition wherein the mixture of alcohols obtainable by the carboxylic reduction of the acyl radicals of coconut oil, said mixture being comprised principally of dodecyl alcohol, is esterified by a saturated aliphatic low molecular weight hydroxy carboxylic acid of the class consisting of lactic, glycolic, hydracrylic, tartaric, citric, malic, trihydroxyglutaric and beta hydroxybutyric acids.

16. An ester of a straight chain primary alcohol of 10 to 14 carbon atoms with glycolic acid.

GEORGE D. GRAVES.

CERTIFICATE OF CORRECTION.

Patent No. 2,122,716.  July 5, 1938.

GEORGE D. GRAVES.

It is hereby certified that error appears in the printed specification of the above numbered patent requiring correction as follows: Page 1, second column, line 11, for "neurtla" read neutral; page 2, second column, line 7, for "meditizens" read plasticizers; and that the said Letters Patent should be read with this correction therein that the same may conform to the record of the case in the Patent Office.

Signed and sealed this 15th day of November, A. D. 1938.

Henry Van Arsdale (Seal)  Acting Commissioner of Patents.

tion of the acyl radicals of an essentially saturated fatty oil, said mixture being comprised principally of dodecyl alcohol, is esterified by a saturated aliphatic low molecular weight hydroxy carboxylic acid.

5. An ester composition wherein the mixture of alcohols obtainable by the carboxylic reduction of the acyl radicals of coconut oil, said mixture being comprised principally of dodecyl alcohol, is esterified by a saturated aliphatic low molecular weight hydroxy carboxylic acid.

6. The ester composition of claim 5 wherein the acid is a monocarboxylic acid.

7. A dodecyl ester of a saturated aliphatic low molecular weight hydroxy carboxylic acid.

8. A dodecyl ester of a saturated aliphatic low molecular weight hydroxy monocarboxylic acid.

9. An ester composition wherein the mixture of alcohols obtainable by the carboxylic reduction of the acyl radicals of coconut oil, said mixture being comprised principally of dodecyl alcohol, is esterified by lactic acid.

10. An ester of a straight chain primary alcohol of 10 to 14 carbon atoms with lactic acid.

11. A tetradecyl ester of a saturated aliphatic low molecular weight hydroxy carboxylic acid.

12. A process for the preparation of esters which comprises heating a saturated straight chain aliphatic alcohol of ten to fourteen carbon atoms with a member of the class consisting of saturated aliphatic low molecular weight hydroxy carboxylic acids and their esters with volatile alcohols.

13. An ester of a straight chain primary alcohol of 10 to 14 carbon atoms with a saturated aliphatic low molecular weight hydroxy carboxylic acid of the class consisting of lactic, glycolic, hydracrylic, tartaric, citric, malic, trihydroxyglutaric and beta hydroxybutyric acids.

14. An ester composition wherein the mixture of alcohols obtainable by the carboxylic reduction of the acyl radicals of an essentially saturated fatty oil, said mixture being comprised principally of dodecyl alcohol, is esterified by a saturated aliphatic low molecular weight hydroxy carboxylic acid of the class consisting of lactic, glycolic, hydracrylic, tartaric, citric, malic, trihydroxyglutaric and beta hydroxybutyric acids.

15. An ester composition wherein the mixture of alcohols obtainable by the carboxylic reduction of the acyl radicals of coconut oil, said mixture being comprised principally of dodecyl alcohol, is esterified by a saturated aliphatic low molecular weight hydroxy carboxylic acid of the class consisting of lactic, glycolic, hydracrylic, tartaric, citric, malic, trihydroxyglutaric and beta hydroxybutyric acids.

16. An ester of a straight chain primary alcohol of 10 to 14 carbon atoms with glycolic acid.

GEORGE D. GRAVES.

---

CERTIFICATE OF CORRECTION.

Patent No. 2,122,716.     July 5, 1938.

GEORGE D. GRAVES.

It is hereby certified that error appears in the printed specification of the above numbered patent requiring correction as follows: Page 1, second column, line 11, for "neurtla" read neutral; page 2, second column, line 7, for "meditizens" read plasticizers; and that the said Letters Patent should be read with this correction therein that the same may conform to the record of the case in the Patent Office.

Signed and sealed this 15th day of November, A. D. 1938.

Henry Van Arsdale (Seal)            Acting Commissioner of Patents.

CERTIFICATE OF CORRECTION.

Patent No. 2,122,716.  July 5, 1938.

GEORGE D. GRAVES.

It is hereby certified that error appears in the printed specification of the above numbered patent requiring correction as follows: Page 1, second column, line 11, for "neurtla" read neutral; page 2, second column, line 7, for "meditizens" read plasticizers; and that the said Letters Patent should be read with this correction therein that the same may conform to the record of the case in the Patent Office.

Signed and sealed this 15th day of November, A. D. 1938.

Henry Van Arsdale (Seal)  Acting Commissioner of Patents.